United States Patent
Tsuda et al.

(10) Patent No.: US 10,069,778 B2
(45) Date of Patent: Sep. 4, 2018

(54) STORAGE MEDIUM, COMMUNICATION TERMINAL, AND DISPLAY METHOD FOR ENABLING USERS TO EXCHANGE MESSAGES

(71) Applicant: NINTENDO CO., LTD., Kyoto (JP)

(72) Inventors: Munetaka Tsuda, Kyoto (JP); Yui Iida, Kyoto (JP); Kouichi Kawamoto, Kyoto (JP); Taiyo Hara, Kyoto (JP); Ryoma Aoki, Kyoto (JP); Naonori Oonishi, Kyoto (JP); Akihiro Umehara, Kyoto (JP); Ginga Kamei, Kyoto (JP); Hiroaki Hiruma, Kyoto (JP); Masayuki Okada, Kyoto (JP); Yasuto Kakimoto, Kyoto (JP); Arisa Yanagi, Kyoto (JP); Hayuru Soma, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 133 days.

(21) Appl. No.: 14/746,210

(22) Filed: Jun. 22, 2015

(65) Prior Publication Data

US 2016/0234149 A1  Aug. 11, 2016

(30) Foreign Application Priority Data

Feb. 5, 2015  (JP) .................................. 2015-21208

(51) Int. Cl.
| | | |
|---|---|---|
| *G06F 15/16* | (2006.01) | |
| *H04L 12/58* | (2006.01) | |
| *H04L 29/08* | (2006.01) | |

(52) U.S. Cl.
CPC ............ *H04L 51/16* (2013.01); *H04L 67/306* (2013.01)

(58) Field of Classification Search
CPC ........................................................ H04L 51/04
USPC ........................................................ 709/206
See application file for complete search history.

(56) References Cited

U.S. PATENT DOCUMENTS

| | | | | |
|---|---|---|---|---|
| 5,894,305 A | * | 4/1999 | Needham ............ | H04L 12/1822 709/220 |
| 6,212,548 B1 | * | 4/2001 | DeSimone .......... | H04L 12/1813 709/204 |
| 6,784,901 B1 | * | 8/2004 | Harvey ............... | H04L 12/1827 709/204 |
| 7,111,044 B2 | * | 9/2006 | Lee ..................... | H04L 12/1827 709/204 |
| 7,386,799 B1 | * | 6/2008 | Clanton .................. | A63F 13/12 715/753 |
| 7,475,110 B2 | * | 1/2009 | Kirkland ................. | H04L 51/04 709/204 |

(Continued)

FOREIGN PATENT DOCUMENTS

JP         2012-252699        12/2012

*Primary Examiner* — Alicia Baturay
(74) *Attorney, Agent, or Firm* — Nixon & Vanderhye PC (57) ABSTRACT

An exemplary group selection screen shows groups in which users share a message, so that any of the groups is selectable. In an avatar display area (Ar12) for each group, avatars (Av1) of not more than five users belonging to a group, who have recently posted a message, are displayed. An arrangement of the avatars (Av1) is determined based on a posting time and date of a latest message posted by each user represented by an avatar (Av1). In an avatar display area (Ar12), a message included in a balloon is displayed, which message has been posted by a user represented by a displayed avatar (Av1).

17 Claims, 9 Drawing Sheets

(56) References Cited

U.S. PATENT DOCUMENTS

| | | | | |
|---|---|---|---|---|
| 7,484,176 | B2* | 1/2009 | Blattner | G06T 13/40 715/758 |
| 7,559,021 | B2* | 7/2009 | Chen | G06F 17/27 709/204 |
| 7,636,755 | B2* | 12/2009 | Blattner | H04L 12/1822 709/206 |
| 7,689,649 | B2* | 3/2010 | Heikes | G06Q 10/107 709/203 |
| 7,725,538 | B2* | 5/2010 | Kirkland | H04L 51/16 709/204 |
| 7,779,076 | B2* | 8/2010 | Heikes | G06Q 10/107 709/206 |
| 8,015,497 | B2* | 9/2011 | Chen | H04M 1/72552 715/751 |
| 8,026,918 | B1* | 9/2011 | Murphy | G06N 3/006 345/473 |
| 8,037,139 | B1* | 10/2011 | Fish | H04L 51/04 709/204 |
| 8,145,719 | B2* | 3/2012 | Barman | G06Q 10/10 709/206 |
| 8,190,999 | B2* | 5/2012 | Chen | G06Q 10/107 715/753 |
| 8,250,144 | B2* | 8/2012 | Blattner | H04L 12/1822 709/204 |
| 8,402,378 | B2* | 3/2013 | Blattner | G06T 13/40 715/758 |
| 8,547,381 | B2* | 10/2013 | Murphy | G06N 3/006 345/473 |
| 8,566,412 | B2* | 10/2013 | Barman | G06Q 10/10 709/206 |
| 8,589,792 | B2* | 11/2013 | Shuster | G06T 19/20 715/706 |
| 8,627,215 | B2* | 1/2014 | Blattner | H04L 51/04 715/758 |
| 8,694,899 | B2* | 4/2014 | Goossens | G06Q 10/10 715/763 |
| 8,719,359 | B2* | 5/2014 | Barman | G06Q 10/10 709/206 |
| 8,719,425 | B2* | 5/2014 | Barman | G06Q 10/10 709/206 |
| 8,762,475 | B2* | 6/2014 | Cheung | H04L 51/04 709/207 |
| 8,812,954 | B2* | 8/2014 | Shuster | G06T 19/20 715/706 |
| 8,886,740 | B2* | 11/2014 | Barman | G06Q 10/10 709/203 |
| 8,914,444 | B2* | 12/2014 | Hladik, Jr. | G06Q 10/109 709/206 |
| 9,123,157 | B2* | 9/2015 | Shuster | G06T 19/20 |
| 9,130,893 | B2* | 9/2015 | Chang | H04L 51/04 |
| 9,199,171 | B2* | 12/2015 | Mizuki | A63F 13/12 |
| 9,256,861 | B2* | 2/2016 | Blattner | G06Q 10/107 |
| 9,288,171 | B2* | 3/2016 | Barman | G06Q 10/10 |
| 9,374,327 | B2* | 6/2016 | Rao DV | H04L 51/02 |
| 9,415,302 | B2* | 8/2016 | Beppu | A63F 13/71 |
| 9,452,360 | B2* | 9/2016 | Shuster | G06T 19/20 |
| 9,454,747 | B2* | 9/2016 | Schultz | G06Q 10/10 |
| 9,483,859 | B2* | 11/2016 | Blattner | G06T 13/40 |
| 9,492,754 | B2* | 11/2016 | Beppu | A63F 13/12 |
| 9,569,075 | B2* | 2/2017 | Kyogoku | G06F 3/04842 |
| 9,652,134 | B2* | 5/2017 | Goossens | G06Q 10/10 |
| 9,889,375 | B2* | 2/2018 | Shuster | G06T 13/40 |
| 2010/0005402 | A1* | 1/2010 | George | H04L 51/04 715/758 |
| 2014/0143273 | A1* | 5/2014 | Sakaino | G06F 17/30545 707/770 |
| 2014/0298210 | A1* | 10/2014 | Park | G06F 3/0486 715/758 |
| 2014/0330912 | A1* | 11/2014 | Mizuki | H04L 51/32 709/206 |

* cited by examiner

STORAGE MEDIUM, COMMUNICATION TERMINAL, AND DISPLAY METHOD FOR ENABLING USERS TO EXCHANGE MESSAGES

CROSS REFERENCE TO RELATED APPLICATIONS

The disclosure of Japanese Patent Application No. 2015-21208, filed on Feb. 5, 2015, is incorporated herein by reference.

FIELD

The exemplary embodiment relates to a technique for enabling users to exchange messages.

BACKGROUND AND SUMMARY

Known in the art is an instant messenger, which is an application that enables users to perform real-time communication via a network.

An exemplary embodiment provides a non-transitory storage medium storing a program for causing a computer to execute a process, the process including: causing a display unit to display a list of groups, each of the groups including users that share a message, the list showing message information for each of the groups, the message information indicating a message posted in a group, the message satisfying a predetermined condition, or indicating a user who has posted the message; accepting a selection of one of the groups included in the list displayed on the display unit; and causing, in response to the selection of a group, the display unit to display at least part of messages shared in the group.

DETAILED DESCRIPTION OF NON-LIMITING EXAMPLE EMBODIMENTS

1. Exemplary Embodiment

1-1. Hardware Configuration 1-1-1. Communication System 1

Figure 1:
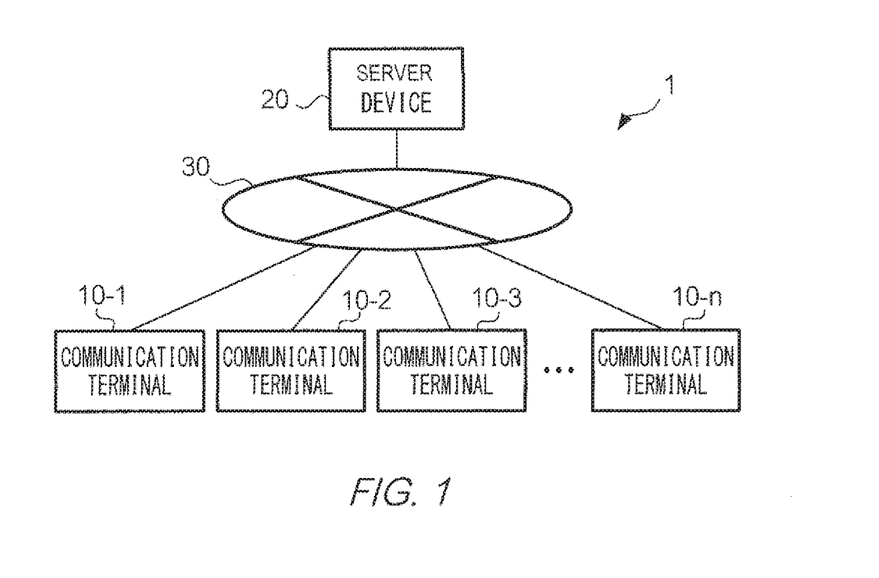
FIG. 1 shows an example of a configuration of communication system 1.

FIG. 1 is a block diagram showing an example of a configuration of communication system 1 of an exemplary embodiment. Communication system 1 includes plural communication terminals 10-1 to 10-n and server device 20. Communication terminals 10-1 to 10-n are coupled with server device 20 via network 30. Communication terminals 10-1 to 10-n will be hereinafter referred to as "communication terminal 10" except where it is necessary to specify otherwise. Network 30 includes, for example, a mobile telephone network, a wireless local area network (LAN), or the Internet. Communication system 1 provides users of communication terminals 10 with a messaging service, or specifically an instant messaging service, which enables communication terminals 10 to exchange messages.

1-1-2. Communication Terminal 10

Figure 2:
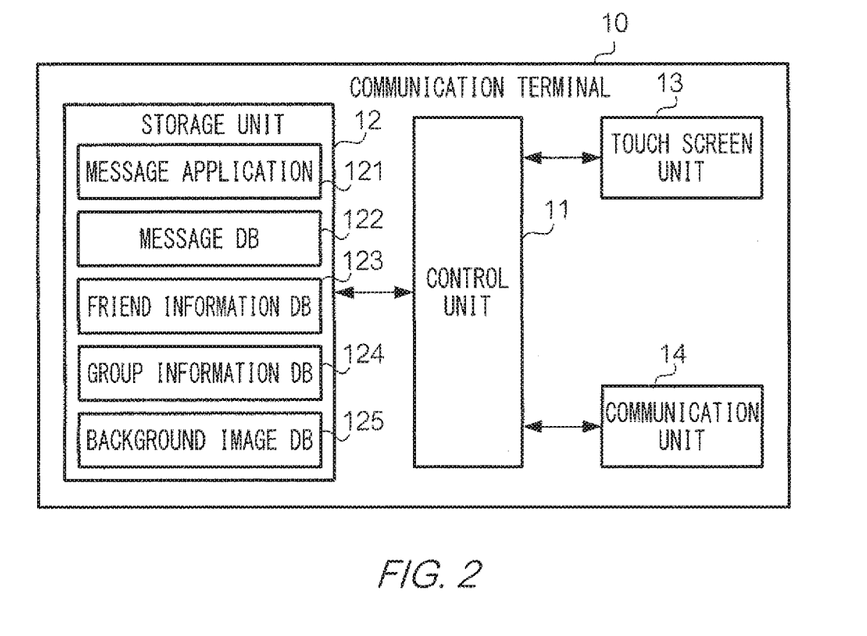
FIG. 2 shows an example of a hardware configuration of communication terminal 10.

FIG. 2 is a block diagram showing an example of a hardware configuration of communication terminal 10. Communication terminal 10 is a computer device such as a smartphone, a tablet terminal, or a game machine. Communication terminal 10 may be a stationary computer device. Communication terminal 10 exchanges a message with another communication terminal 10 via server device 20 and network 30.

Communication terminal 10 includes control unit 11, storage unit 12, touch screen unit 13, and communication unit 14, as shown in FIG. 2. Control unit 11 includes a processing unit such as a central processing unit (CPU), and a memory. A CPU controls components of communication terminal 10 by executing a program stored in the memory or storage unit 12.

Storage unit 12 is a storage device such as a flash memory or a hard disk. Storage unit 12 stores programs executed by a CPU and various types of data. Storage unit 12 stores message application 121 in particular, which is a program for displaying, creating, exchanging, and managing messages. Functions of message application 121 will be described later.

Storage unit 12 also stores message database 122, which stores data on messages exchanged using message application 121. The term "database" will hereinafter be referred to as "DB." Message DB 122 stores received message data and sent message data. Each item of received message data includes, for example, a sender user ID, a receipt time and date, a message body, a group ID, and a background image ID. Each item of sent message data includes, for example, a receiver user ID, a transmission time and date, a message body, a group ID, and a background image ID.

Storage unit 12 also stores friend information DB 123, which stores data on friends of a user of communication terminal 10. A "friend" as used herein refers to a communication partner of a user of communication terminal 10. A friend may be, for example, a user of another communication terminal 10, who has performed a predetermined approval procedure in relation to a user of communication terminal 10. The predetermined approval procedure, for example, may be performed as follows: a user sends a friend request to another user; and the other user approves the friend request. Data on each friend stored in friend information DB 123 may include, for example, a user ID, a user name, profile information, and avatar data. A user name is identification information for identifying a user; specifically, a communication address such as a mail address or a telephone number.

An avatar is an image of a character displayed as a user's alter ego in a virtual space created on a computer network or in a game. A character shown in an avatar is characterized mainly by its face, hairstyle, hair color, body shape, skin color, clothes, and accessories, which characteristics differentiate one avatar from another. A character shown in an avatar may have an appearance of a human or of any entity that can be used as a user's alter ego, other than a human, such as an animal or a robot.

An avatar may be a two-dimensional image or a three-dimensional image. An avatar may be a still image or an animated image. An avatar may be created by a user using an application, or may be selected by a user from among candidates pre-stored in storage unit 12. Avatar data of a user of communication terminal 10 is stored in storage unit 12.

Storage unit 12 also stores group information DB 124, which stores data on groups formed by one or more friends. A "group" as used herein refers to a community in which plural friends share a message simultaneously. A group may be, for example, formed through the following procedure: a user invites a friend user to a group; and the friend user accepts the invitation. A group may be formed by two friends including a user of communication terminal 10. Data of each group stored in group information DB 124 includes, for example, a group ID, a group name, and user IDs of users forming a group.

Storage unit 12 also stores background image DB 125, which stores data on background images used in exchanging a message. A "background image" as used herein refers to an image constituting a frame image, described later, on which a message and an avatar are superimposed. In a background image, a balloon is displayed, which is an area in which a message is superimposed. A background image may be a still image or an animated image. Data relevant to each background image stored in background image DB 125 includes, for example, a background image ID, background image data, and display control data. "Display control data" as used herein refers to data defining a method by which an avatar is displayed in a background image. Display control data is, specifically, data defining a feature of an avatar shown in a background image, such as a position, a facial expression, an action, clothes, or accessories.

Touch screen unit 13 includes a display panel and a touch sensor disposed on the display panel. The display panel is, for example, a liquid crystal display or an organic electroluminescence (EL) display. The touch sensor is, for example, a capacitance-type or resistance-film-type touch sensor. Touch screen unit 13 displays an image under control of control unit 11, and receives an instruction from a user using his/her finger or a stylus.

Communication unit 14 is a communication interface such as a data communication card. Communication unit 14 controls data communication with server device 20.

1-1-3. Server Device 20

Figure 3:
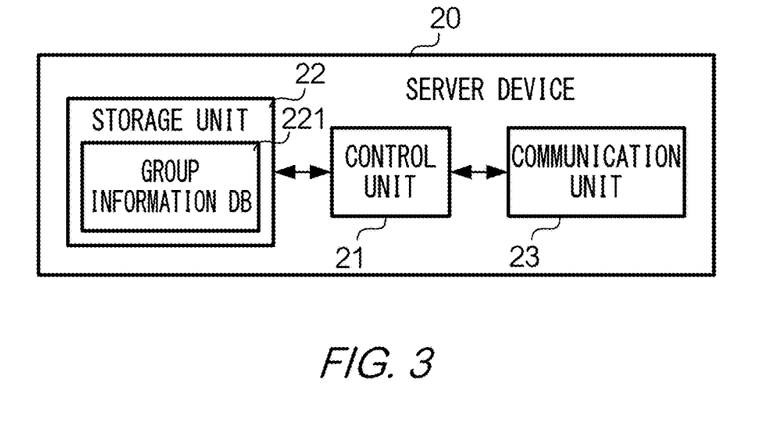
FIG. 3 shows an example of a hardware configuration of server device 20.

FIG. 3 is a block diagram showing an example of a hardware configuration of server device 20. Server device 20 is an instant message server that relays a message between communication terminals 10. Server device 20 includes control unit 21, storage unit 22, and communication unit 23, as shown in FIG. 3.

Control unit 21 includes a processing unit such as a CPU, and a memory. A CPU controls components of server device 20 by executing a program stored in the memory or storage unit 22.

Storage unit 22 is a storage device such as a hard disk. Storage unit 22 stores programs executed by a CPU and various types of data. Storage unit 22 also stores group information DB 221, which stores data on groups formed by users of communication terminals 10. Group information DB 221 collectively stores group data stored in group information DBs 221 of communication terminals 10. Each item of group data stored in group information DB 221 includes, for example, a group ID, a group name, and user IDs of users forming a group.

Communication unit 23 is a communication interface such as a data communication card. Communication unit 23 controls data communication with communication terminal 10.

1-2. Functional Configurations

Functional configurations of communication terminal 10 will be described. Specifically, a functional configuration for displaying a message and a functional configuration for creating and exchanging a message will be described. The functions are provided by executing message application 121 stored in storage unit 12.

1-2-1. Message Display Function

Figure 4:
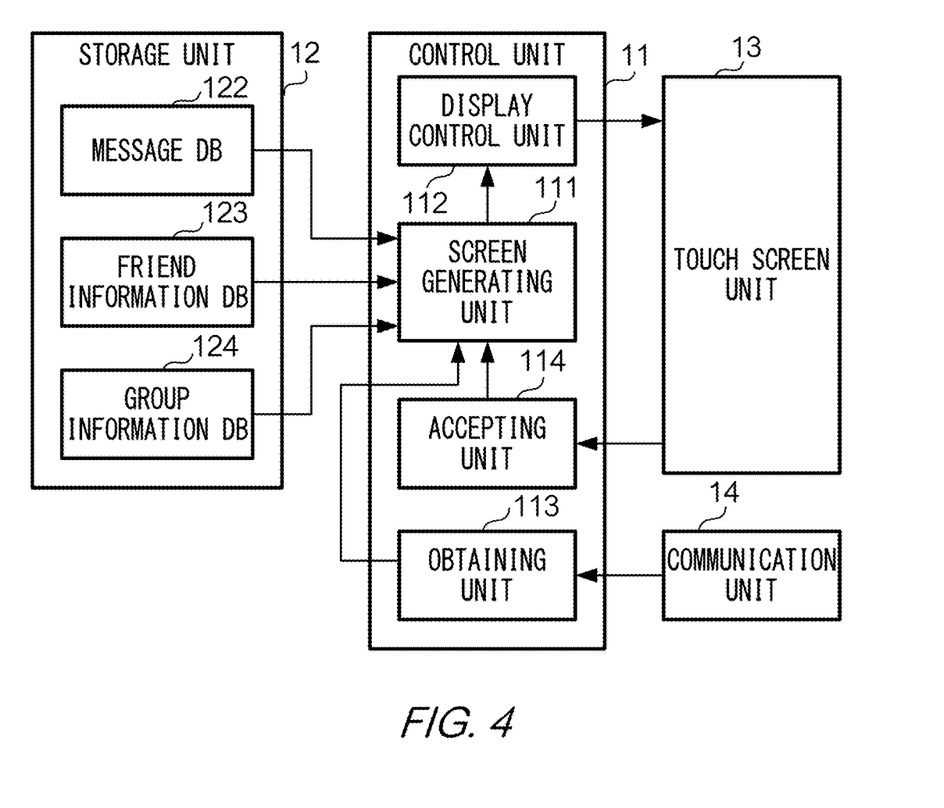
FIG. 4 shows an example of a functional configuration for displaying a message.

FIG. 4 is a block diagram showing an example of a functional configuration for displaying a message. Execution of message application 121 provides screen generating unit 111, display control unit 112, obtaining unit 113, and accepting unit 114, as shown in FIG. 4.

Screen generating unit 111 generates a group selection screen in response to initiation of message application 121. The group selection screen is a screen showing a list of plural groups, each of which includes plural users who share messages. The group selection screen shows message information for each of the plural groups. "Message information" as used herein refers to a message posted in a group, which satisfies a predetermined condition, and information indicative of a user who has posted the message. A message may be expressed by an image. A message that satisfies a predetermined condition is, specifically, a message posted recently or a last posted message. Information indicative of a user who has posted a message is, specifically, an avatar representing the user. Screen generating unit 111 generates the group selection screen with reference to message DB 122, friend information DB 123, and group information DB 124.

Display control unit 112 causes touch screen unit 13 to display a group selection screen generated by screen generating unit 111.

Figure 5:
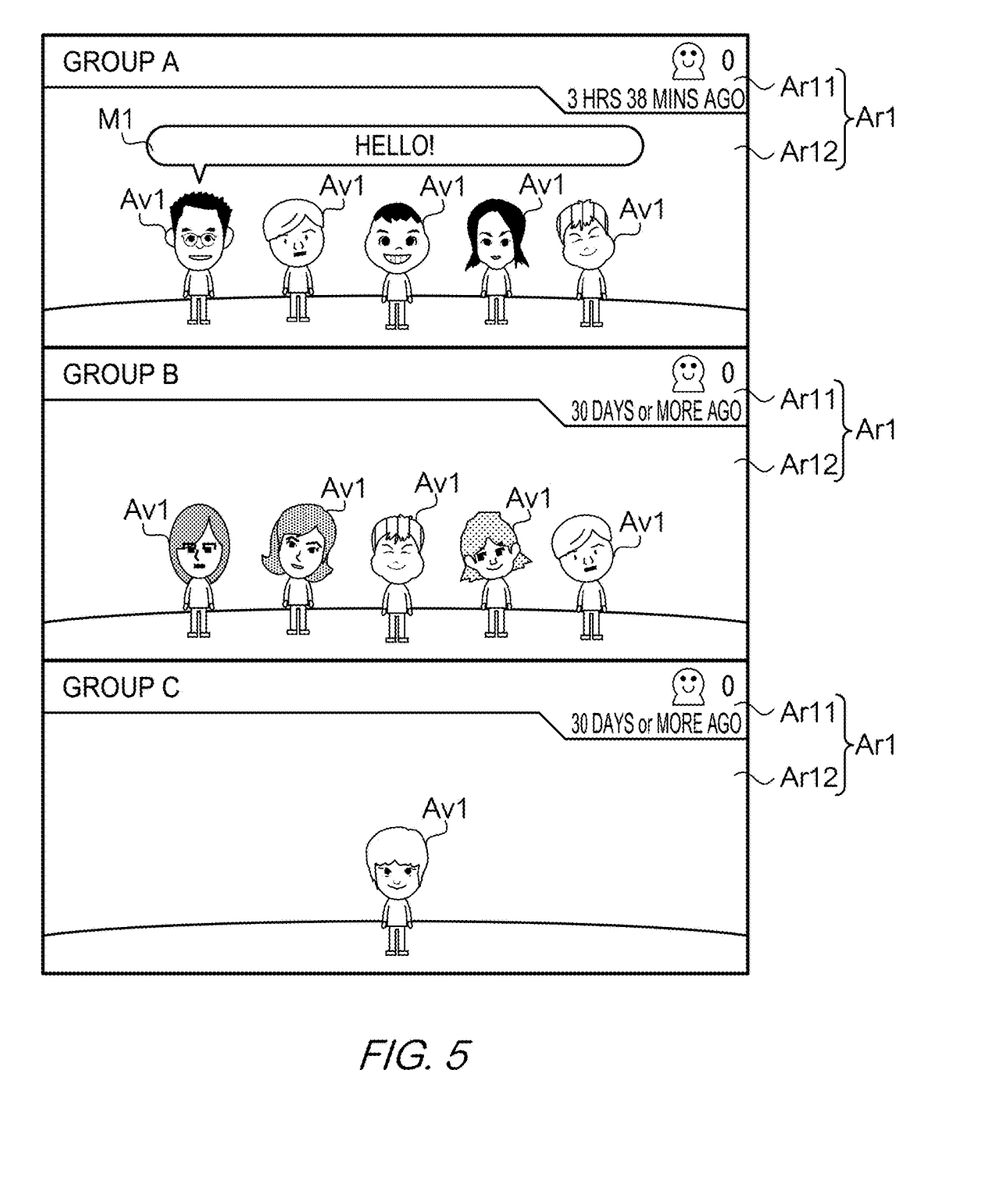
FIG. 5 shows an example of a group selection screen.

FIG. 5 is a diagram showing an example of a group selection screen displayed by display control unit 112. The group selection screen shown in FIG. 5 is a home screen of message application 121, which is displayed in response to initiation of the application. On the group selection screen, three groups appear so that any one of the groups is selectable. Each of the groups is displayed in one of group display areas Ar1, which have a rectangular shape. Group display areas Ar1 are arranged in a vertical direction. Group display areas Ar1 are also arranged in a descending order of a posting time and date (in other words, a receiving time and date; the same shall apply hereinafter) of a latest message posted in each group. The group selection screen can be vertically scrolled to display preceding or subsequent group display areas Ar1.

An image showing each of group display areas Ar1 may be a two-dimensional image or a three-dimensional image. A three-dimensional image may be obtained by capturing an image of avatars arranged in a virtual space using a virtual camera. Each of group display areas Ar1 includes group information display area Ar11 and avatar display area Ar12. Group information display area Ar11 and avatar display area Ar12 each have a substantially rectangular shape. They are stacked in a vertical direction. In group information display area Ar11, a group name, the number of active users, and a latest posting time and date may appear. In group information display area Ar11 for group A shown in FIG. 5, a group name "GROUP A," the number of active users "0," and a posting time and date "3 HRS 38 MINS AGO" appear. The number of active users is the number of users belonging to a group, who are displaying or creating a message when a group selection screen is displayed.

In avatar display area Ar12, avatars Av1 of users belonging to a group are arranged for display in a horizontal direction. Avatars Av1 displayed in avatar display area Ar12 are, in particular, avatars of not more than five users belonging to a group, who have recently posted a message. Positions of avatars Av1 are determined based on a posting time and date of a latest message posted by each user represented by an avatar. Specifically, avatar Av1 of a user who has posted a latest message is positioned at the left side, avatar Av1 of a user who has posted a second latest message is positioned at the right side, avatar Av1 of a user who has posted a third latest message is positioned at a second space from the left, avatar Av1 of a user who has posted a fourth latest message is positioned at a second space from the right, and avatar Av1 of a user who has posted a fifth latest message is positioned at the center. In short, avatars of users who have posted latest messages are positioned farthest from the center.

Each of avatars Av1 shows a standing full-faced character. Each of avatars Av1 is an animated image of a character, whose facial expression or action changes over time. A type of animation may differ for each avatar, which may be determined according to a predetermined condition. For example, a type of animation may be determined based on, for example, a situation of message posting in a group. Specifically, an animated image showing a sleeping character may be displayed in a situation where no message has been posted in a group for a predetermined time period.

In avatar display area Ar12, also appearing are messages that have been posted by users represented by displayed avatars Av1. Each message is displayed in association with avatar Av1 of a user who has posted the message. Specifically, each message is displayed near avatar Av1 of a user who has posted the message. More specifically, each message is displayed in, for example, an oval balloon, which corresponds to avatar Av1 of a user who has posted the message. Each message is enclosed in a balloon that is indicated as coming from corresponding avatar Av1, which clarifies an association between the message and avatar Av1. In the group selection screen shown in FIG. 5, a message "HELLO!" appears above avatars Av1 as a message posted by a user represented by leftmost avatar Av1. A part of a message that cannot be included in a balloon is hidden.

Figure 6:
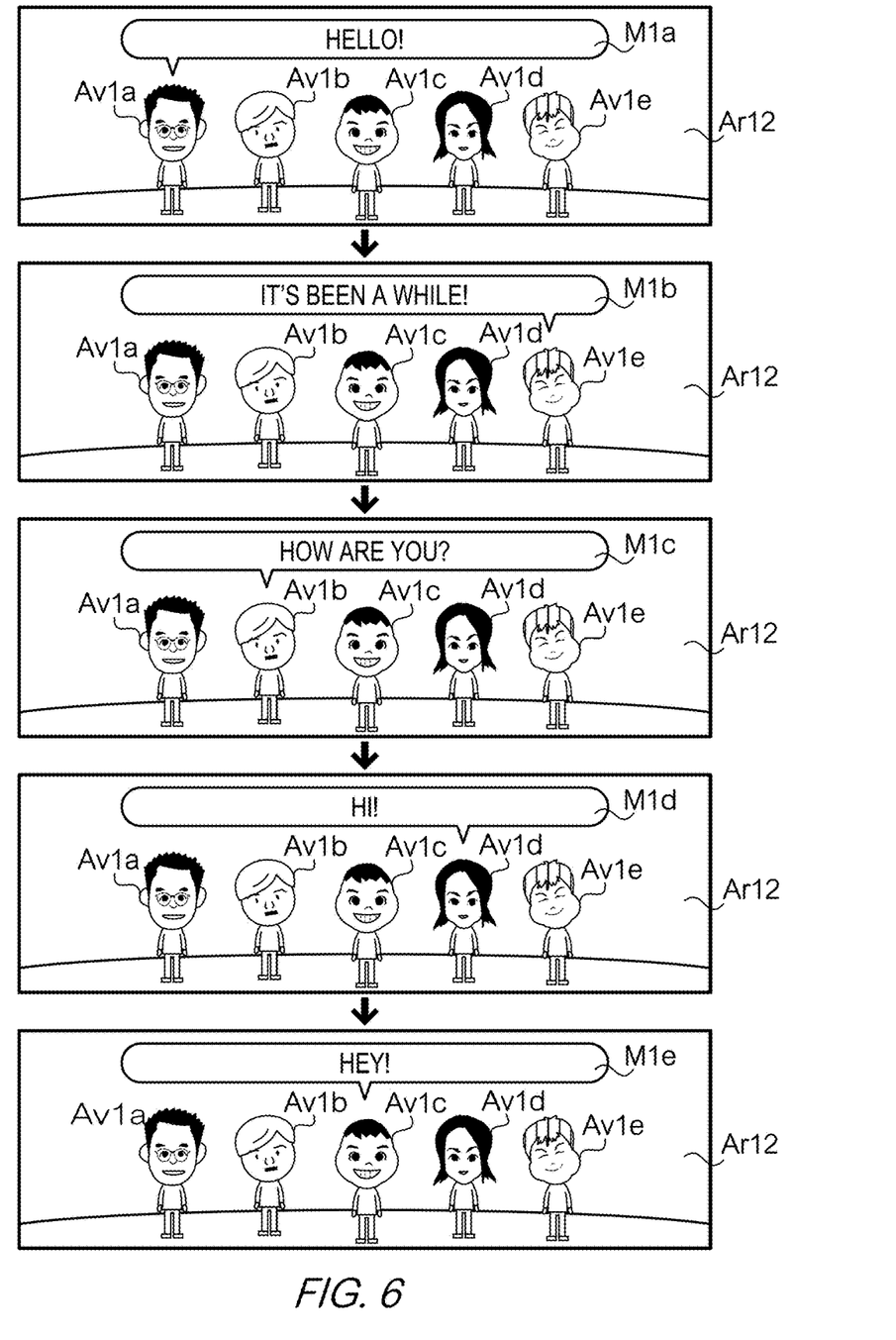
FIG. 6 shows an example of transition of messages displayed in avatar display area Ar12.

Messages are displayed in a descending order of a posting time and date in a case where plural avatars Av1 are displayed, as in the case of avatar display area Ar12 for group A shown in FIG. 5. FIG. 6 is a diagram showing an example of transition of messages displayed in avatar display area Ar12 for group A shown in FIG. 5. As for group A shown in FIG. 5, messages corresponding respectively to avatars Av1a, Av1e, Av1b, Av1d, and Av1c are displayed in such an order, since a descending order of a posting date and time of a latest message posted by a corresponding user is as follows: avatars Av1a, Av1e, Av1b, Av1d, and Av1c. The messages are sequentially displayed at regular intervals. Avatar Av1 of a user, whose message is being displayed, may be highlighted to clarify an association between avatar Av1 and the message.

The foregoing is a description of a group selection screen.

A group selection screen described in the foregoing enables a user to check situations of message posting for plural groups by referring only to a single screen. Specifically, the group selection screen enables a user to check, for each group, users who have recently posted a message, and contents of the posted messages.

Obtaining unit 113 obtains a posting notice that reports that a new message has been posted in a group registered in group information DB 124. The posting notice is sent by server device 20, and obtaining unit 113 obtains the posting notice via communication unit 14. Obtaining unit 113 may periodically contact server device 20 to check for posting of a new message, instead of merely waiting for a posting notice. The posting notice sent from server device 20 includes a user ID of a poster, a group ID, message information, and a background image ID.

When obtaining unit 113 obtains a posting notice while a group selection screen is displayed, screen generating unit 111 generates data to update message information displayed for a group, for which a new message has been posted. Specifically, screen generating unit 111 generates a new group selection screen. Message information as used herein refers to a message posted in a group, which satisfies a predetermined condition, and information indicative of a user who has posted the message. A message that satisfies a predetermined condition is, specifically, a message posted recently or a last posted message. Information indicative of a user who has posted a message is, specifically, an avatar representing the user. To generate a new group selection screen, screen generating unit 111 identifies an avatar of a poster based on a user ID included in the posting notice with reference to friend information DB 123.

Screen generating unit 111 may generate data to update message information displayed for a group, for which a new message has been posted, when obtaining unit 113 obtains a posting notice while a message display screen (described later), instead of a group selection screen, is displayed.

Display control unit 112 updates a group selection screen currently displayed on touch screen unit 13 with a new group selection screen generated by screen generating unit 111. Display control unit 112 may carry out the update in real-time, without waiting for a user's instruction. Display control unit 112 may carry out an update repeatedly.

Display control unit 112, when obtaining unit 113 obtains a posting notice while a message display screen is displayed, may display a new group selection screen generated by screen generating unit 111 at the top of a message display screen currently displayed on touch screen unit 13. When doing so, display control unit 112 may temporarily display only an image of avatar display area Ar12 included in the new group selection screen, which corresponds to a group for which a new message has been posted.

Figure 7A:
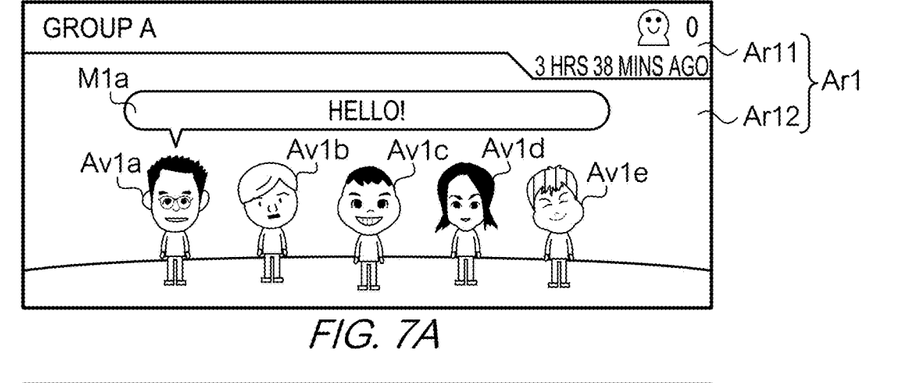
FIGS. 7A to 7C show an example of transition of group selection screens.
Figure 7B:
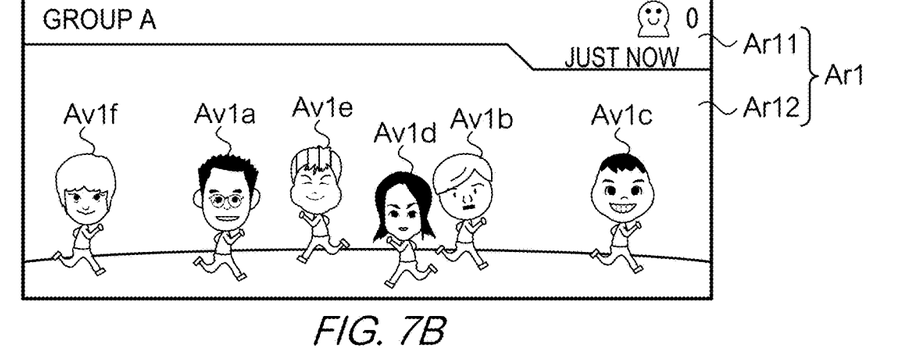
Figure 7C:
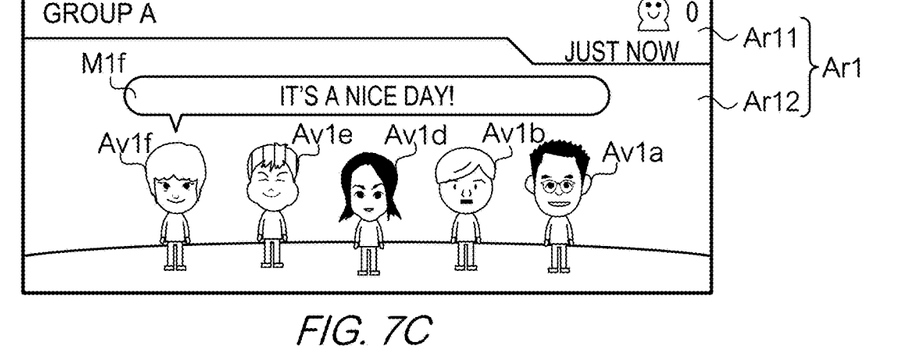

FIGS. 7A to 7C show an example of transition of group selection screens, which is performed in response to posting of a new message during display of a group selection screen.

FIGS. 7A to 7C show transition of avatar display area Ar12 for group A in particular, which is included in the group selection screen shown in FIG. 5. The transition of group selection screens shown in FIGS. 7A to 7C is performed when a new message is posted by a user belonging to group A, whose avatar is not displayed in avatar display area Ar12.

FIG. 7A shows an image displayed prior to an update of a group selection screen. The image shown in FIG. 7A is identical to that of avatar display area Ar12 for group A shown in FIG. 5.

FIG. 7B shows a scene of a screen transition animation displayed when the group selection screen is updated. The screen transition animation shows a process of switching avatars Av1, which is performed in response to posting of a new message. In the process, new avatar Av1 appears in avatar display area Ar12, which represents a user who has posted a new message, and avatar Av1 whose corresponding posting time and date is oldest disappears from avatar display area Ar12 among avatars Av1 appearing in avatar display area Ar12. In the group selection screen shown in FIG. 7B, new avatar Av1$f$, which is to be positioned at the left side of the screen, appears, and avatar Av1$c$ disappears.

The screen transition animation also shows a process of relocating avatars Av1 are in response to posting of a new message. As for avatars Av1 appearing in avatar display area Ar12, which are not switched, an order of a posting time and date of a latest message is lowered by one in response to posting of a new message. Accordingly, each of avatars Av1 is relocated to a position corresponding to its lowered order. In the group selection screen shown in FIG. 7B, avatar Av1$a$ is relocated to the right end on the screen, avatar Av1$e$ is relocated to a second space from the left, avatar Av1$b$ is relocated to a second space from the right, and avatar Av1$d$ is relocated to the center.

In the above processes of switching and relocating avatars Av1, characters represented by avatars Av1 are shown to move by running. The characters simultaneously move to a new position, while avoiding hitting each other. A new character appearing in avatar display area Ar12 enters the screen from the left side thereof, and a character disappearing from avatar display area Ar12 exits the screen from the right side thereof.

While the screen transition animation is displayed, display of a message posted in the group may be omitted. A posting time and date of a latest message displayed in group information display area Ar11 is updated to, for example, "JUST NOW" in response to posting of a new message.

FIG. 7C shows an image displayed subsequent to the update of the group selection screen. In avatar display area Ar12 shown in FIG. 7C, avatar Av1$f$, which has been newly added by the above switch, and avatars Av1$a$, Av1$b$, Av1$d$, and Av1$e$, which have been relocated as described above, are displayed. Each of avatars Av1 shows a standing full-faced character. In avatar display area Ar12, messages posted by users represented by displayed avatars Av1 appear. Each of the messages is displayed within a balloon, which corresponds to avatar Av1 of a user who has posted the message. The messages are displayed in a descending order of a posting time and date. Specifically, messages corresponding respectively to avatars Av1$f$, Av1$a$, Av1$e$, Av1$b$, and Av1$d$ are displayed in order of avatars Av1$f$, Av1$a$, Av1$e$, Av1$b$, and Av1$d$. The messages are sequentially displayed at regular intervals.

The foregoing is a description of transition of a group selection screen. It is to be noted that, although FIGS. 7A to 7C show a case example where a new message is posted, plural avatars Av1 may be switched in a case where plural messages are simultaneously posted by different users.

Accepting unit 114 accepts a selection of any one of groups displayed on a group selection screen, via touch screen unit 13. A group is selected by, for example, tapping group display area Ar1 displayed on touch screen unit 13. Alternatively, a group may be selected by an input operation using an input device such as a mouse or a keyboard, or by a vocal input operation using a speech recognition technology.

When communication unit 14 accepts a selection of a group, screen generating unit 111 generates a message display screen that displays at least part of messages shared in the selected group. When doing so, screen generating unit 111 generates the message display screen with reference to message DB 122, friend information DB 123, and background image DB 125. Display control unit 112 causes touch screen unit 13 to display the message display screen generated by screen generating unit 111.

Figure 8:
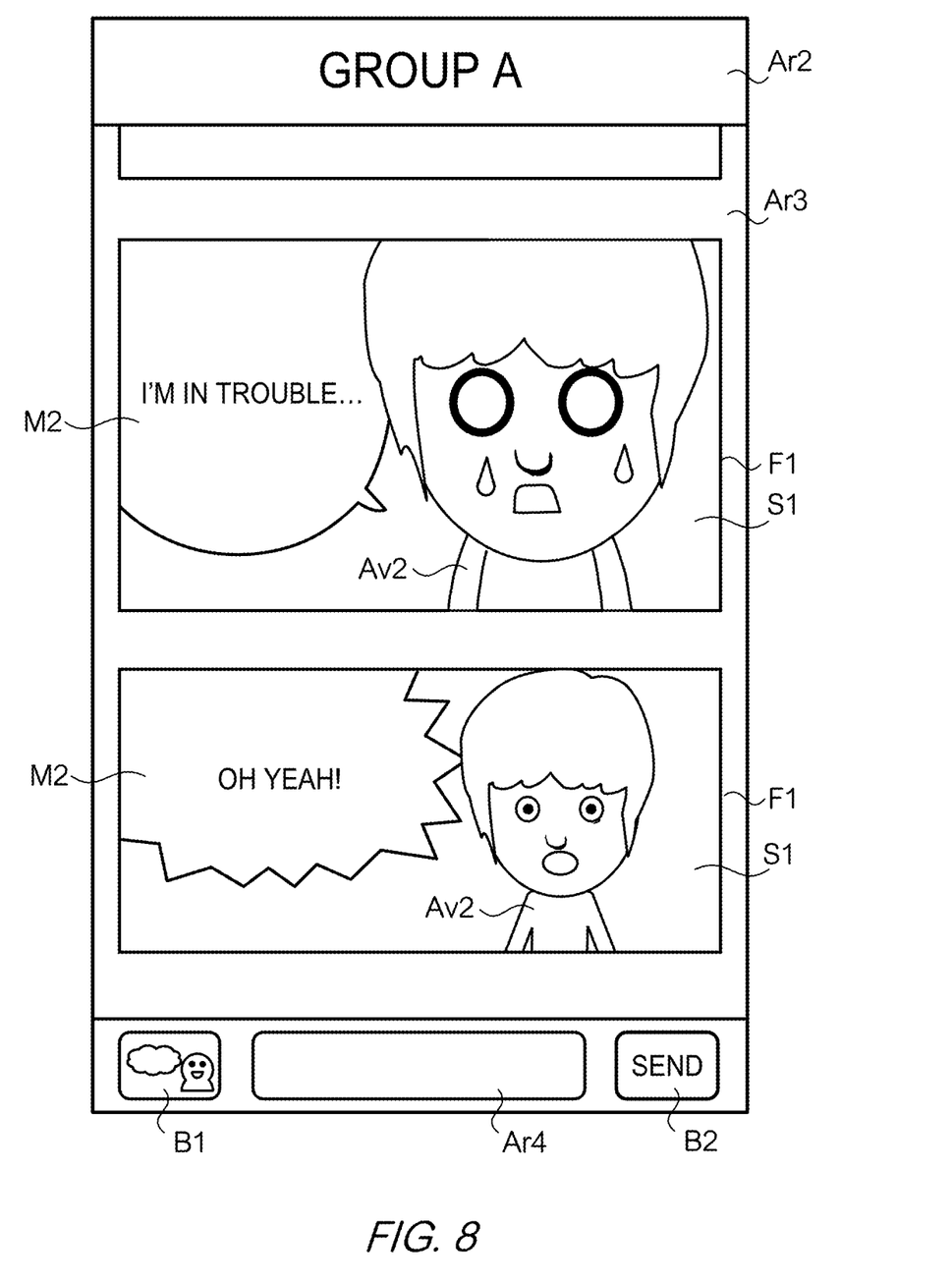
FIG. 8 shows an example of a message display screen.

FIG. 8 is a diagram showing an example of the message display screen. The message display screen shown in FIG. 8 shows group name display area Ar2, message history display area Ar3, background selection field display button B1, message input field Ar4, and send button B2. The display components have a substantially rectangular shape. Group name display area Ar2, message history display area Ar3, and message input field Ar4 are arranged vertically on the message display screen. Background selection field display button B1 is positioned to the left of message input field Ar4, and send button B2 is positioned to the right of the same field.

In group name display area Ar2, a name of a group, messages of which appear on a message display screen, appears horizontally.

In message history display area Ar3, plural frame images F1, each of which shows a message shared in a group, are arranged vertically for display. In message history display area Ar3, frame images F1 are arranged in chronological order; in other words, a timeline of frame images F1 are displayed. Specifically, frame images F1 are arranged from the top in an ascending order of a posting time and date of a message shown in each frame image F1. Although FIG. 8 shows only two frame images F1, frame images F1 appearing in message history display area Ar3 can be vertically scrolled to display preceding or subsequent frame images F1. Frame image F1 that initially appears in message history display area Ar3 when a message display screen is displayed, may be, for example, a message that remains unread by a user, and whose posting time and date is oldest.

Frame image F1 is an image showing a frame of a cartoon. A frame of a cartoon as used herein refers to an area in which a picture showing a scene of a cartoon is recorded. A frame of a cartoon is, typically, surrounded by a rectangular border line. A series of frames of a cartoon describes a transition of scenes.

Frame image F1 includes message M2, avatar Av2, and background image S1. Avatar Av2 is superimposed on background image S1, and message M2 is inserted into a balloon shown in background image S1. A method by which avatar Av2 appears in frame image F1 is determined based on display control data associated with background image S1.

If avatar Av2 constituting frame image F1 is an animated image, selecting the frame image by, for example, tapping the frame image causes an animated sequence to be played.

Background selection field display button B1 is a button for ordering transition to a frame image creation screen (described later).

Message input field Ar4 accepts an input of a message. A selection of message input field Ar4 by, for example, tapping the field causes a software keyboard (not shown), or a screen keyboard, to appear at the top of message history display area Ar3. The software keyboard enables a user to input a message.

Send button B2 is a button for providing an instruction to post a created frame image.

The foregoing is a description of a message display screen.

A message display screen described in the foregoing enables a user to read messages exchanged in a group as if reading a cartoon strip.

1-2-2. Message Creation and Exchange Function

Figure 9:
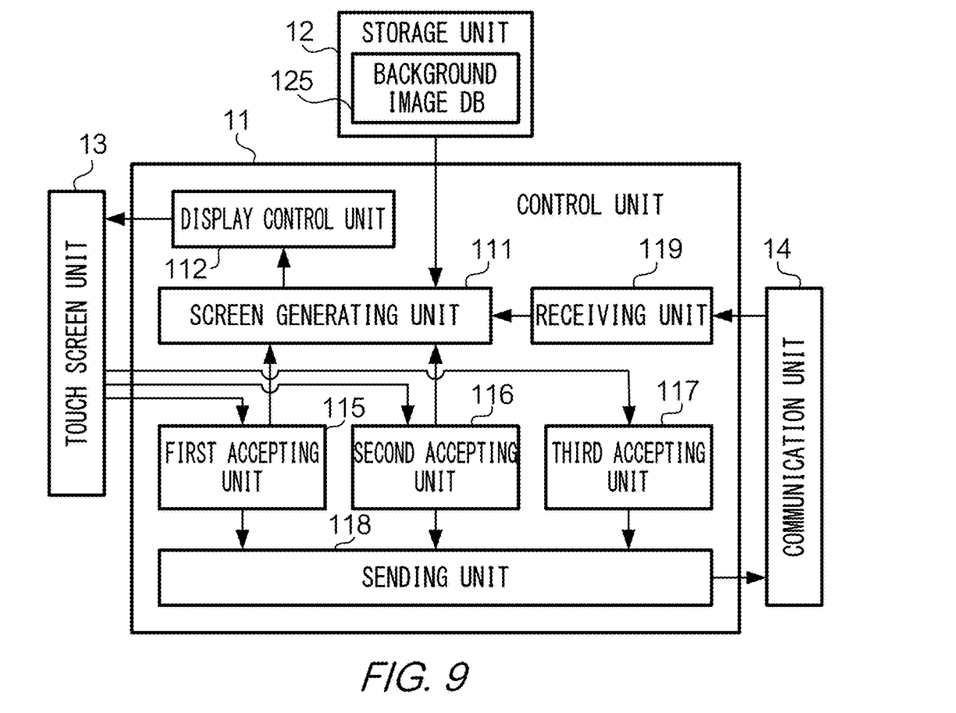
FIG. 9 shows an example of a functional configuration for creating and exchanging a message.

FIG. 9 is a block diagram showing an example of a functional configuration for creating and exchanging a message. Execution of message application 121 provides screen generating unit 111, display control unit 112, first accepting unit 115, second accepting unit 116, third accepting unit 117, sending unit 118, and receiving unit 119, as shown in FIG. 9.

Screen generating unit 111 generates a frame image creation screen when background selection field display button B1 is selected by, for example, tapping the button. When doing so, screen generating unit 111 generates the frame image creation screen with reference to background image DB 125.

Display control unit 112 causes touch screen unit 13 to display a frame image creation screen generated by screen generating unit 111.

Figure 10:
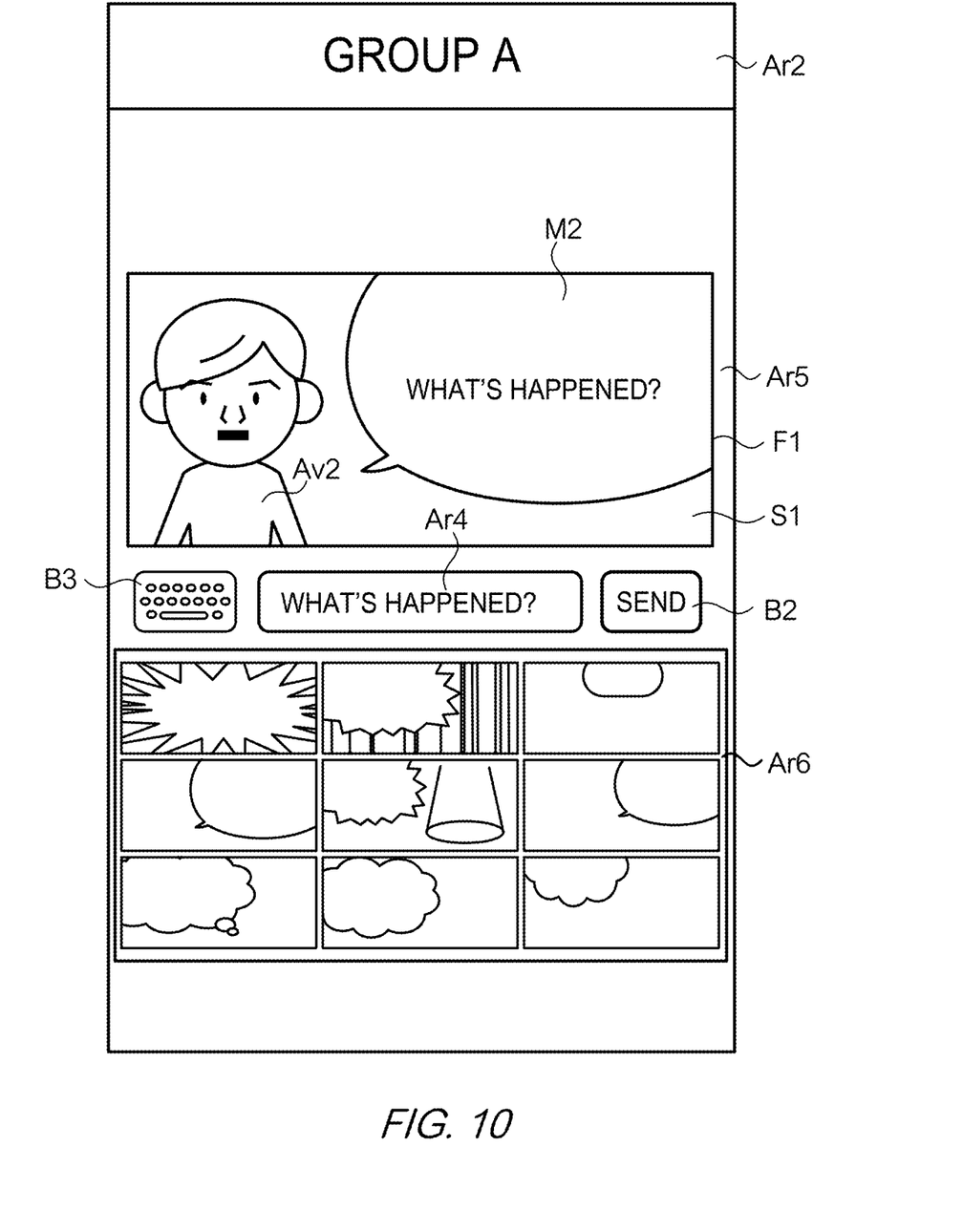
FIG. 10 shows an example of a frame image creation screen.

FIG. 10 is a diagram showing an example of the frame image creation screen displayed by display control unit 112. The frame image creation screen shown in FIG. 10 shows group name display area Ar2, preview display area Ar5, keyboard button B3, message input field Ar4, send button B2, and background candidate display area Ar6. The display components have a substantially rectangular shape. Group name display area Ar2, preview display area Ar5, message input field Ar4, and background candidate display area Ar6 are arranged vertically on the frame image creation screen. Keyboard button B3 is positioned to the left of message input field Ar4, and send button B2 is positioned to the right of the same field.

In group name display area Ar2, a name of a group appears horizontally, in which created frame image F1 is to be shared.

In preview display area Ar5, a preview of frame image F1 appears. A preview of frame image F1 is displayed to enable a user to check, prior to posting of the frame image, how the image frame appearing in message history display area Ar3 looks.

A preview of frame image F1 is displayed when background image S1 is selected in background candidate display area Ar6. The preview of frame image F1 is generated by combining background image S1 with avatar Av2 of a user. If background image S1 or avatar Av2, which constitutes the frame image, is an animated image, the animation is shown.

When message M2 is input in message input field Ar4 during display of the preview of frame image F1, a preview of frame image F1, into which message M2 has been further mixed, is displayed. The mixture of message M2 into frame image F1 may be performed on a word-by-word basis while message M2 is being input.

When background image S1 is selected in background candidate display area Ar6 after another background image S1 is selected, a preview of new frame image F1 is displayed, which is generated by combining the newly selected background image with avatar Av2 of a user. In such a case, if message M2 has already been input in message input field Ar4, a preview of frame image F1, to which the message has been further mixed, is generated. A position of message M2 in frame image F1 changes depending on a position of a balloon shown in the selected background image.

Keyboard button B3 is a button for providing an instruction to display a software keyboard. When keyboard button B3 is selected by, for example, tapping the button, a software keyboard (not shown) is caused to appear, for example, at the top of background candidate display area Ar6. The displayed software keyboard enables a user to input a message in message input field Ar4.

Message input field Ar4 accepts an input of a message.

Send button B2 is a button for providing an instruction to post created frame image F1.

In background candidate display area Ar6, candidates for background image S1 appear so that any of the candidates is selectable. The candidates for background image S1 are background images registered in background image DB 125, which are displayed in background candidate display area Ar6 in a reduced size.

The foregoing is a description of a frame image creation screen.

First accepting unit 115 accepts an input of a message. Specifically, first accepting unit 115 accepts a message input in message input field Ar4, via touch screen unit 13. First accepting unit 115 outputs message information indicative of the input message to screen generating unit 111 and sending unit 118. A message may be input character-by-character using a software keyboard, or may be input by selecting one of the candidates for a message displayed on the screen.

Second accepting unit 116 accepts a selection of an image to be associated with a message accepted by first accepting unit 115. Specifically, second accepting unit 116 accepts a selection of one of the background images displayed in background candidate display area Ar6, via touch screen unit 13. The background image is selected together with the message on a screen, posted together with the message, and displayed together with the message. The selected background image may be an animated image. Second accepting unit 116 outputs image information indicative of the selected background image to screen generating unit 111 and sending unit 118. The image information is, specifically, a background image ID.

Screen generating unit 111, on obtaining a background image ID output from second accepting unit 116, generates, based on the background image ID, a frame image to be displayed in preview display area Ar5. Specifically, screen generating unit 111 obtains background image data identified by the obtained background image ID from background image DB 125, to generate a frame image composed of a background image represented by the background image data and an avatar of a user. A method by which the avatar appears in the frame image is determined based on display control data associated with the background image. Display control unit 112 causes the frame image generated by screen generating unit 111 to appear in preview display area Ar5. The display of the frame image is carried out prior to posting of the frame image.

When screen generating unit 111, subsequent to the display of the frame image, obtains message information output from first accepting unit 115 that has accepted an input of a message, screen generating unit 111 generates a frame image composed of not only the background image and the avatar but also the message indicated by the message information. Display control unit 112 causes the frame image to appear in preview display area Ar5. When second accepting unit 116, subsequent to the display of the frame image, accepts a selection of a background image that is different from the displayed background image, screen generating unit 111 generates a new frame image to be displayed in preview display area Ar5, based on a background image ID output from second accepting unit 116. In the frame image, display of the already input message is maintained.

Third accepting unit 117 accepts a transmission instruction to send message information indicative of a message accepted by first accepting unit 115, and image information indicative of an image accepted by second accepting unit 116, in association with each other. In other words, third accepting unit 117 accepts a transmission instruction to send a set of message information and image information. Third accepting unit 117, specifically, accepts the transmission instruction through a selection of send button B2 displayed on touch screen unit 13. Send button B2 may be selected by tapping the button, by an input operation using an input device such as a mouse or a keyboard, or by a vocal input operation using a speech recognition technology. Send button B2 enables a user to send a set of message information and image information by a single action. Third accepting unit 117, on accepting a transmission instruction, notifies sending unit 118 of the acceptance of a transmission instruction.

Sending unit 118 sends message information output from first accepting unit 115 and image information output from second accepting unit 116, to another communication terminal 10 in association with each other. Specifically, sending unit 118 sends a set of message information and image information to another communication terminal 10. Alternatively, sending unit 118 sends an item of data including a part corresponding to message information and a part corresponding to image information to another communication terminal 10. Alternatively, sending unit 118 sends image information to which message information has been mixed, to another communication terminal 10. Image information herein refers to, specifically, a background image ID. Sending unit 118, when third accepting unit 117 accepts a transmission instruction, carries out the transmission by use of communication unit 14. When doing so, sending unit 118 further sends processing information to another communication terminal 10, which is used to process a background image identified by a background image ID. Specifically, sending unit 118 sends processing information to another communication terminal 10 in association with message information and image information. Processing information herein refers to, specifically, information indicative of an avatar of a user. More specifically, processing information is, for example, a user ID.

Processing information may be image data representing a user's avatar. Alternatively, processing information may be a part number indicative of one of a set of parts constituting a user's avatar, which number differs for each part, or may be a part ID, which identifies one of prepared candidates for a part.

Figure 11:
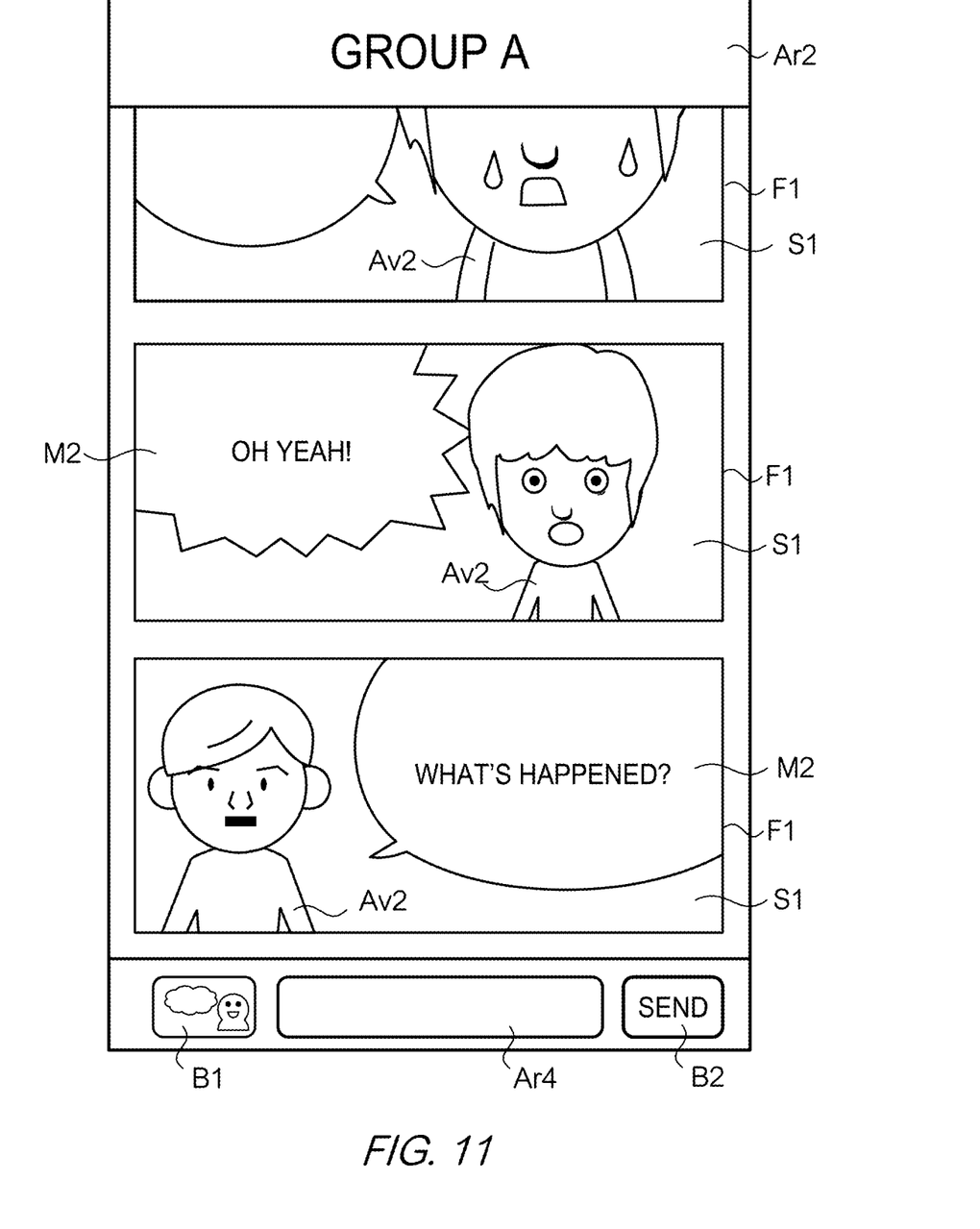
FIG. 11 shows an example of a message display screen.

After sending unit 118 carries out the transmission, display control unit 112 causes a frame image appearing in preview display area Ar5 to appear in message history display area Ar3 of a message display screen. FIG. 11 is a diagram showing an example of the message display screen displayed after sending unit 118 carries out the transmission. The message display screen shown in FIG. 11 is displayed when send button B2 is selected on the above frame image creation screen shown in FIG. 10. On the message display screen shown in FIG. 11, frame image F1 that has been displayed in preview display area Ar5 of the frame image creation screen shown in FIG. 10 is displayed at the bottom of message history display area Ar3, or in other words below a latest frame image F1 displayed in message history display area Ar3.

Receiving unit 119 receives a set of message information and image information from another communication terminal 10 via communication unit 14. Image information herein refers to, specifically, a background image ID. Receiving unit 119 also receives processing information from another communication terminal 10, which is used to process a background image identified by a background image ID. Processing information herein refers to, specifically, information indicative of an avatar of a user of another communication terminal 10. More specifically, processing information is, for example, a user ID.

Screen generating unit 111 generates a frame image composed of a message indicated by message information received by receiving unit 119 and a background image identified by a background image ID received by receiving unit 119. The generated frame image is displayed in message history display area Ar3. When generating the frame image, screen generating unit 111 processes the background image based on processing information received by receiving unit 119. Specifically, screen generating unit 111 combines the background image with an avatar of a user of another communication terminal 10. When doing so, screen generating unit 111 processes a facial expression of a character shown in the avatar, based on the background image to which the avatar is mixed. Specifically, screen generating unit 111 processes the facial expression based on display control data associated with the background image. Screen generating unit 111 also arranges a message at the top of the background image.

Display control unit 112 causes the frame image generated by screen generating unit 111 to appear in message history display area Ar3. An example of the frame image is shown in FIG. 11.

1-3. Operation

Figure 12:
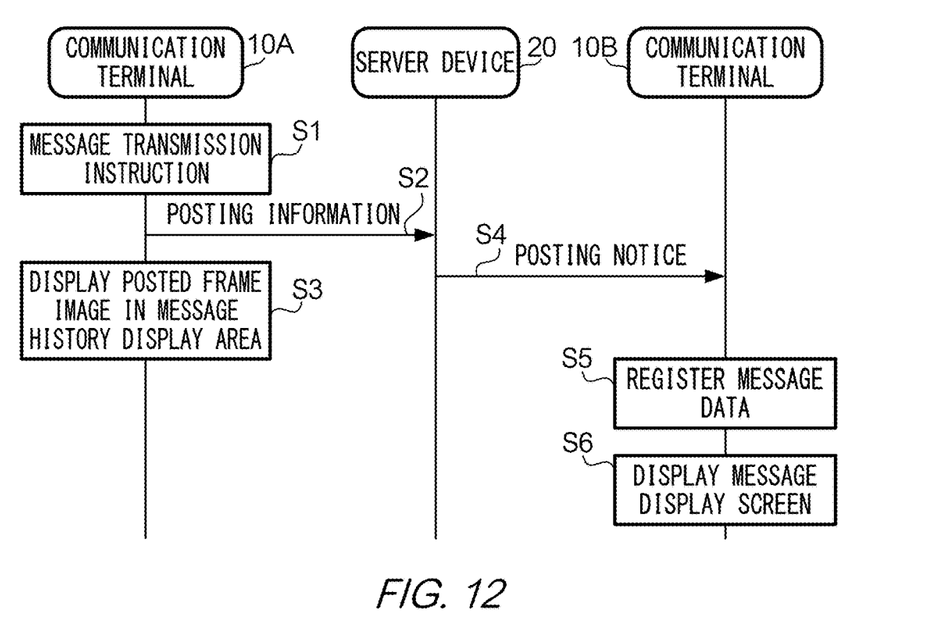
FIG. 12 shows an example of an operation of communication system 1.

An operation of communication system 1 will be described. Specifically, an operation performed in a process where communication terminals 10 share a message will be described. FIG. 12 is a sequence chart showing an example of an operation of communication system 1. In the following description of the operation, it is assumed that two communication terminals 10 share a message. Communication terminal 10 that sends a message will be referred to as "communication terminal 10A" and communication terminal 10 that receives a message will be referred to as "communication terminal 10B." It is to be noted that the number of communication terminals 10 that share a message may be three or more.

When a user of communication terminal 10A selects a background image, inputs a message, and selects send button B2 on a frame image creation screen illustrated in FIG. 10 (step S1), communication terminal 10A sends posting information including a background image ID indicative of the selected background image and message information indicative of the input message to server device 20 (step S2). The posting information also includes a user ID of the user, or a poster, and a group ID of a group in which the message is shared. After sending the posting information, communication terminal 10A displays, in message history display area Ar3, a frame image that has been displayed in preview display area Ar5 when send button B2 has been selected (step S3).

Server device 20, on receiving the posting information, identifies communication terminal 10B as a destination of a posting notice based on the group ID included in the posting information. Specifically, server device 20 identifies communication terminal 10B by identifying a user ID associated in group information DB 221 with the group ID included in the posting information. Server device 20 sends a posting notice to communication terminal 10B (step S4). The posting notice includes the message information, the background image ID, the user ID of the user of communication terminal 10A, and the group ID.

Communication terminal 10B, on receiving the posting notice, registers information on a message included in the posting notice in message DB 122 (step S5). Specifically, communication terminal 10B registers the user ID of the user of communication terminal 10A, a receiving time and date, the message information, the group ID, and the background image ID in association with each other.

Subsequently, in communication terminal 10B, when message application 121 is started and a group is selected on a group selection screen, communication terminal 10B displays a message display screen illustrated in FIG. 11 (step S6). If the group identified by the group ID registered in step S5 is selected, communication terminal 10B displays, in message history display area Ar3, a message associated with the group ID in message DB 122. When doing so, communication terminal 10B combines the background image identified by the background image ID with the avatar of the user of communication terminal 10A and the message to generate and display a frame image.

2. Modifications

The above exemplary embodiment may be modified as described below. Two or more of the following modifications may be combined with each other.

2-1. Modification 1

A group selection screen illustrated in FIG. 5 may be modified as described below. In a group selection screen, a set of a user(s) registered in friend information DB 123 and a user of communication terminal 10 may be displayed as a group that can be selected. An update of a group selection screen illustrated in FIGS. 7A to 7B may be performed only when a newly posted message satisfies a predetermined condition. For example, a group selection screen may be updated when a level of importance or urgency of a posted message equals or exceeds a predetermined threshold, or when the message has been posted by a predetermined user. An order of group display areas Ar1 arranged on a group selection screen may be an ascending order of a registration time and date at which data on a group has been registered in group information DB 124, or may be an order predetermined by a user.

A user whose avatar is displayed in avatar display area Ar12 may be a user who has posted a message that satisfies a predetermined condition. The message satisfying a predetermined condition may be a message having a level of importance or urgency that equals or exceeds a predetermined threshold, a message that remains unread, or a message whose posting time and date is within a predetermined time after a group selection screen is displayed. Avatars displayed in avatar display area Ar12 may be arranged from the left or right of the screen in a descending order of a posting time and date of a latest message posted by a user represented by an avatar. In short, avatars may be arranged in chronological order.

The number of users whose avatars are displayed in avatar display area Ar12 may be less than or more than five. In avatar display area Ar12, a user ID, instead of an avatar, may be displayed as information indicative of a user. In avatar display area Ar12, only one of an avatar and a message may appear. If a space of avatar display area Ar12 allows, messages of plural users may be displayed simultaneously. Display of a balloon that encloses a message may be omitted. Display of a balloon shown in a frame image may be omitted.

2-2. Modification 2

An operation illustrated in FIG. 12 may be modified as described below. Communication terminal 10A may send posting information to server device 20, which includes a part or all of avatar data of a user of the terminal, background image data representing a background image selected by the user, and display control data corresponding to the background image. Server device 20 may send a posting notice to communication terminal 10B, which includes the data included in the posting information. When doing so, server device 20 may initially send a posting notice to communication terminal 10B, which merely reports that communication terminal 10A has posted a message, and send, in response to a data request from communication terminal 10B, the data included in the posting information to the terminal.

Communication terminal 10A may send data other than data indicative of a background image to server device 20, together with message information. For example, communication terminal 10A may send data indicative of an image, picture, or video of a two-dimensional or three-dimensional object. Alternatively, communication terminal 10A may send data indicative of a voice or a vibration pattern.

Server device 20 may send question data indicative of a question to communication terminals 10A and 10B to activate communication between the terminals. Each communication terminal 10 displays the question indicated by the question data in message history display area Ar3 of a message display screen. Posting of a response to the question by each user activates communication between communication terminals 10A and 10B.

Whether question data should be sent to communication terminal 10 may be set for each group. A timing at which question data is sent may be determined depending on a situation of message posting of a group. For example, question data may be sent in a situation where the number of messages posted in a group per unit time is equal or smaller than a predetermined threshold.

Messages may be exchanged between communication terminals 10A and 10B through peer-to-peer (P2P) communication, without server device 20.

2-3. Modification 3

A part or all of data stored in storage unit 12 of communication terminal 10 may be stored in another device on a

2-4. Modification 4

When a user of communication terminal 10 has posted a frame image that satisfies a predetermined condition, a frame image posted thereafter by another user may be subjected to a predetermined processing before it is displayed. For example, when a user of communication terminal 10 has posted a frame image showing a character who turns off a light, a frame image posted by another user may be subjected to a processing by which the frame image is darkened. When a user has posted a frame image showing a fairy who casts a spell, a frame image posted by another user may be subjected to a processing by which an expression of a message constituting the frame image is changed. When a user has posted a frame image showing a character who squeezes ketchup out of a bottle, a frame image posted by another user may be subjected to a processing by which an image of ketchup droplets is added to a face part of an avatar constituting the frame image. When a user has posted a frame image showing a scene of snowstorm, a frame image posted by another user may be subjected to a processing by which animation showing shivering is added to an avatar constituting the frame image.

The processing illustrated in the foregoing may be determined based on any of a background image, an avatar, and a message that constitute a posted frame image. A subject of a processing may be any of a background image, an avatar, and a message that constitute a frame image. A time period for which frame images are subjected to a processing and the number of frame images subjected to a processing may be set for each type of processing. A processing may be applied in not only communication terminal 10 whose user has posted a frame image that satisfies a predetermined condition, but also another communication terminal 10, which shares the posted frame image.

2-5. Modification 5

Message application 121 stored in storage unit 12 of communication terminal 10 may be provided to the terminal via a computer-readable storage medium. The storage medium is, for example, a magnetic storage medium such as a magnetic tape or a magnetic disk, an optical storage medium such as an optical disk, or a semiconductor memory. Message application 121 may be provided to communication terminal 10 via a network such as the Internet.

What is claimed is:

1. A non-transitory storage medium storing a program for causing a computer to provide execution comprising:
    causing a display to display a list of groups, each of the groups including users that share a message, the list showing message information for each of the groups, the message information indicating a message posted in a group, the message satisfying a predetermined condition, or indicating a user who has posted the message;
    accepting a selection of one of the groups included in the list displayed on the display; and
    causing, in response to the selection of a group, the display to display at least part of messages shared in the group;
    wherein the causing of the display to display the list of groups comprises causing the display to simultaneously display the list of the groups and, for at least one of the displayed groups, a message that satisfies the predetermined condition and information indicative of a user who has posted the message in association with each other;
    the computer is further caused to execute: automatically switching, a display of messages shared in the at least one of the displayed groups in the order of posting of the messages shared in the at least one of the displayed groups, each of the messages shared in the at least one of the displayed groups being displayed in association with information indicative of the corresponding user who has posted the message; and
    the computer is further caused to execute: a display of avatars representing respective users who posted messages, the display of avatars changing positions using animation in response to posting of a new message.

2. The non-transitory storage medium according to claim 1, wherein the causing of the display to display the list of groups comprises repeatedly updating the message information displayed on the display.

3. The non-transitory storage medium according to claim 2, wherein:
    the execution further comprises obtaining a posting notice that reports that a new message has been posted in one of the groups; and
    the causing of the display to display the list of groups comprises updating, in response to obtaining of the posting notice, message information displayed relative to the group in which the new message has been posted.

4. The non-transitory storage medium according to claim 1, wherein the causing of the display to display the list of groups comprises causing the display to display plural items of message information for each of the groups in an order of posting of messages corresponding to message information.

5. The non-transitory storage medium according to claim 4, wherein the causing of the display to display the list of groups comprises causing the display to display plural items of message information for each of the groups, the plural items of message information being arranged in the order of posting of messages corresponding to message information.

6. The non-transitory storage medium according to claim 1, wherein the information indicative of a user who has posted the message that satisfies the predetermined condition comprises an avatar representing the user.

7. The non-transitory storage medium according to claim 6, wherein the causing of the display to display the list of groups comprises causing the display to display the message that satisfies the predetermined condition in a balloon corresponding to the avatar.

8. The non-transitory storage medium according to claim 6, wherein the avatar is an animated image.

9. The non-transitory storage medium according to claim 6, wherein the avatar is a three-dimensional image.

10. The non-transitory storage medium according to claim 6, wherein the causing of the display to display the list of groups comprises changing the avatar according to a situation of message posting of a group corresponding to the avatar.

11. The non-transitory storage medium according to claim 1, wherein the computer is further caused to execute: automatically switching, a display of messages simultaneously for each the displayed groups.

12. A communication terminal, comprising:
    a processing system, including a computer processor, the processing system being at least configured to:
    cause a display to display a list of groups, each of the groups including users that share a message, the list showing message information for each of the groups, the message information indicating a message posted in a group, the message satisfying a predetermined condition, or indicating a user who has posted the message; and accept a selection of one of the groups included in the list displayed on the display, the display control causing, in response to the selection of a group, the display to display at least part of messages shared in the group;

wherein causing of the display to display the list of groups comprises causing the display to simultaneously display the list of the groups and, for at least one of the displayed groups, a message that satisfies the predetermined condition and information indicative of a user who has posted the message in association with each other;

the processing system is further configured to automatically switch, a display of messages shared in the at least one of the displayed groups in the order of posting of the messages shared in the at least one of the displayed groups, each of the messages shared in the at least one of the displayed groups being displayed in association with information indicative of the corresponding user who has posted the message; and the processing system is further configured to: a display of avatars representing respective users who posted messages, the display of avatars changing positions using animation in response to posting of a new message.

13. The communication terminal according to claim 12, wherein
the processing system is further configured to: automatically switching, a display of messages simultaneously for each the displayed groups.

14. A display method carried out by a communication terminal, the method comprising:
causing a display to display a list of groups, each of the groups including users that share a message, the list showing message information for each of the groups, the message information indicating a message posted in a group, the message satisfying a predetermined condition, or indicating a user who has posted the message;

accepting a selection of one of the groups included in the list displayed on the display; and causing, in response to the selection of a group, the display to display at least part of messages shared in the group;

wherein the causing of the display to display the list of groups comprises causing the display to simultaneously display the list of the groups and, for at least one of the displayed groups, a message that satisfies the predetermined condition and information indicative of a user who has posted the message in association with each other; and the method further comprises automatically switching, a display of messages shared in the at least one of the displayed groups in the order of posting of the messages shared in the at least one of the displayed groups, each of the messages shared in the at least one of the displayed groups being displayed in association with information indicative of the corresponding user who has posted the message; and displaying avatars representing respective users who posted messages, the display of avatars changing positions using animation in response to the posting of a new message.

15. The method according to claim 14, further comprising:
automatically switching, a display of messages simultaneously for each the displayed groups.

16. A non-transitory storage medium storing a program for causing a computer to provide execution comprising:
causing a display to display a list of groups, each of the groups including users that share an image, the list showing image information for each of the groups, the image information indicating an image posted in a group, the image satisfying a predetermined condition, or indicating a user who has posted the image;

accepting a selection of one of the groups included in the list displayed on the display; and causing, in response to the selection of a group, the display to display at least part of images shared in the group;

wherein the causing of the display to display the list of groups comprises causing the display to simultaneously display the list of the groups and, for at least one of the displayed groups, an image that satisfies the predetermined condition and information indicative of a user who has posted the image in association with each other;

the computer is further caused to execute: automatically switching, a display of images shared in the at least one of the displayed groups in the order of posting of the images shared in the at least one of the displayed groups, each of the images shared in the at least one of the displayed groups being displayed in association with information indicative of the corresponding user who has posted the image; and the computer is further caused to execute: a display of avatars representing respective users who posted messages, the display of avatars changing positions using animation in response to posting of a new message.

17. The non-transitory storage medium according to claim 16,
wherein the computer is further caused to execute: automatically switching, a display of messages simultaneously for each the displayed groups.

* * * * *